J.-P. QUEST.
HEADLIGHT FOR AUTOMOBILES.
APPLICATION FILED OCT. 8, 1920.

1,413,356.

Patented Apr. 18, 1922.

Witnesses
Milton Lenoir

Inventor
John P. Quest
By Clarence W. Taylor
Attorney

UNITED STATES PATENT OFFICE.

JOHN P. QUEST, OF CHICAGO, ILLINOIS.

HEADLIGHT FOR AUTOMOBILES.

1,413,356.   Specification of Letters Patent.   Patented Apr. 18, 1922.

Application filed October 8, 1920. Serial No. 415,538.

*To all whom it may concern:*

Be it known that I, JOHN P. QUEST, a citizen of the United States of America, residing at Chicago, in the county of Cook and State of Illinois, have invented certain new and useful Improvements in Headlights for Automobiles, of which the following is a specification.

My invention relates to improvements in headlights for automobiles or the like, and the principal objects of my improvements are, First, to afford a construction of lens to avoid the glare from the light striking the eyes of those approaching, whether pedestrians or otherwise:

Second, to provide a vehicle lamp whereby to enable the driver to see the road sufficiently far ahead and to the right and to the left, to guide the vehicle without accident:

Third, to produce a lens at moderate cost and of comparatively great efficiency: and, Fourth, the provision of a headlight having a plurality of radially positioned transparent windows above and below the center of the headlight, and parallel transparent windows disposed centrally of the headlight.

An important feature of my invention is the production of a lens having a black coating on its inner surface excepting on the window areas and a coating of suitable reflecting material on the inner surface of the black coating.

With the above and other related objects in view, my invention consists in the novel features and in the novel combination and arrangement of parts, illustrated in the accompanying drawings forming a part of this specification, and particularly pointed out in the claims hereunto appended: it being understood that changes, variations and modifications in the details of the invention within the scope of the claims, may be resorted to without departing from the spirit or sacrificing any of the advantages thereof:

In the drawings.

Similar reference characters indicate similar parts throughout the several views.

Figure 1:
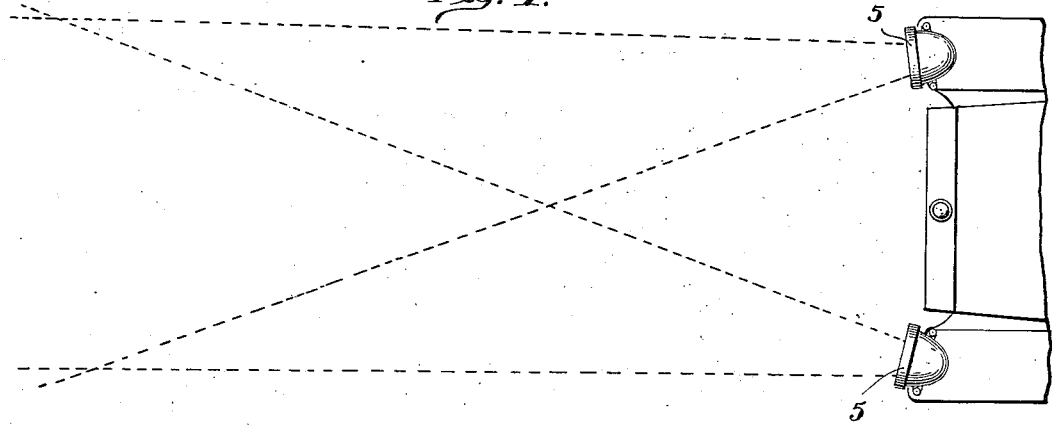
Figure 1 is a top plan of the front end of an automobile, the lamps being slightly inclined inwardly so that the rays of light meet a few hundred feet ahead of the automobile.
Figure 2:
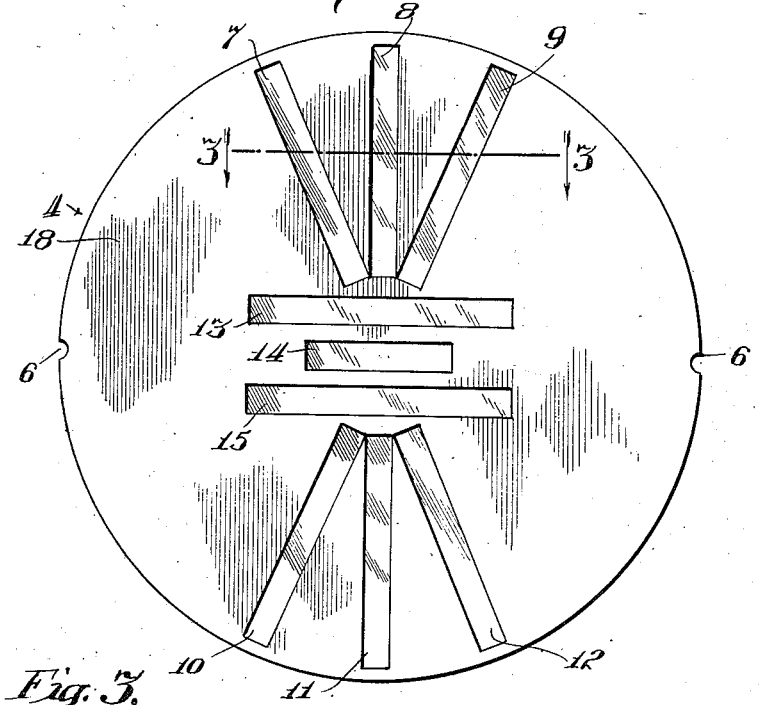
Figure 2 is a rear face view of the lens showing the coated surface thereof.
Figure 3:
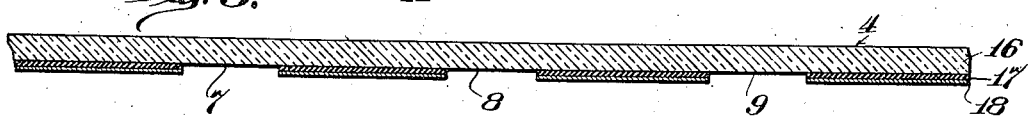
Figure 3 is a cross section on line 3—3 on Figure 2.

For each lens I employ a circular piece of plain glass 4, or other transparent material, coated, as hereinafter set forth, and suitably mounted in a frame 5. Notches 6 are formed oppositely in the periphery of each lens to the frame to prevent rotation of the lens relative to the frame.

Obviously a pin may be employed by fixing it to the frame at one end and the free end of such pins being disposed in the notch 6, or rotation of said lenses may be prevented in any preferred manner.

The lens is provided with a plurality of upper radial transparent windows 7, 8, 9, positioned above the center of the lens, and a plurality of transparent radial windows, 10, 11, 12, positioned below the center of the lens, and a plurality of transparent horizontal parallel windows, 13, 14, 15, positioned centrally of the lens. The dimensions of said windows will depend largely upon the amount of light from the source of light and the efficiency of the reflecting surfaces. The outer surface 16, of said lens is clear and free of any coating whatever. All of the inner surface, excepting said windows, is provided with a coat of black material for example, a black enamel, or paint, 17, then a coat 18, of a reflecting substance, for example, of lead and silver, is put upon the black coat, 17.

Preferably the center windows are limited in length to the outer lines of the radial windows.

Satisfactory service has been had from radial windows of $3\frac{1}{2}$ inches long and $\frac{3}{8}$ inch wide, and the long central windows $3\frac{1}{2}$ inches long and $\frac{3}{8}$ inch wide, the showing herein is illustrative and not drawn to scale, and is not intended to limit the amount of light afforded by the lens, but I do not limit the dimensions or numbers of windows.

Having thus fully described my invention, what I claim as new, and desire to secure by Letters-Patent, is,

1. A headlight lens having a plurality of upper transparent radially positioned windows above the center of the lens and a plurality of lower transparent radially positioned windows below the center of the lens, and a plurality of parallel horizontally positioned windows between said upper and said lower radial windows, the remainder of one surface of said lens being impervious to light.

2. A headlight lens having a plurality of upper transparent radially positioned windows above the center of the lens and a plurality of lower transparent radially positioned windows below the center of said lens, and a plurality of parallel horizontally positioned windows between said upper and said lower radial windows, the remainder of one surface of said lens being impervious to light and having a coat of reflecting material, substantially as shown and described.

3. A headlight lens having a plurality of upper and lower transparent radially extended windows interrupted at the center of the lens and a plurality of parallel horizontally extending windows at the central portion limited in length to the lateral extent of said upper and lower radial windows, the remainder of the lens being impervious to light.

In testimony whereof I affix my signature.

JOHN P. QUEST.